US012748969B2

(12) United States Patent
Kobayashi

(10) Patent No.: US 12,748,969 B2
(45) Date of Patent: Sep. 29, 2026

(54) TRAINING DATA GENERATION DEVICE AND METHOD

(71) Applicant: Fujitsu Limited, Kawasaki (JP)

(72) Inventor: Kenji Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 677 days.

(21) Appl. No.: 18/144,255

(22) Filed: May 8, 2023

(65) Prior Publication Data

US 2023/0385633 A1 Nov. 30, 2023

(30) Foreign Application Priority Data

May 30, 2022 (JP) ................................ 2022-087670

(51) Int. Cl.
*G06N 20/00* (2019.01)
*G06N 3/08* (2023.01)

(52) U.S. Cl.
CPC ..................................... *G06N 3/08* (2013.01)

(58) Field of Classification Search
CPC .......... G06N 20/00; G06N 3/09; G06N 3/045; G06N 3/08; G06N 3/084; G06N 20/10; G06N 3/04; G06N 3/044; G06N 7/01; G06N 20/20; G06N 3/0464; G06N 3/0499; G06N 5/01; G06N 5/04; G06N 3/082; G06N 3/094; G06N 3/0455; G06N 3/047; G06N 3/0442; G06N 3/0475; G06N 3/048; G06N 3/0495; G06N 3/0895; G06N 3/091; G06N 3/0985; G06N 5/02; G06N 5/045;
(Continued)

(56) References Cited

U.S. PATENT DOCUMENTS 10,990,645 B1 * 4/2021 Shi .......................... G06N 3/09
2015/0088791 A1 3/2015 Lin et al.
(Continued)

FOREIGN PATENT DOCUMENTS

WO 2018/167900 A1 9/2018
WO 2021/130995 A1 7/2021

OTHER PUBLICATIONS

Zhang et al., "Towards Accuracy-Fairness Paradox: Adversarial Example-based Data Augmentation for Visual Debiasing", arXiv:2007.13632v2 [cs.CV], Aug. 13, 2020, 9 pages.
(Continued)

*Primary Examiner* — Shyue Jiunn Hwa
(74) *Attorney, Agent, or Firm* — XSENSUS LLP

(57) ABSTRACT

A training data generation device includes a processor that executes a procedure. The procedure includes classifying, based on a feature value, each of a first plural number of training data having a first attribute and each of a second plural number of training data having a second attribute; based on a comparison of a number of training data classified in a first group against a number of training data classified in a second group from among the first plurality of training data, selecting a third plurality of training data from training data classified in a third group and training data classified in a fourth group from among the second plurality of training data, the third group corresponding to the first group, the fourth group corresponding to the second group; and converting each of the third plurality of training data into a fourth plurality of training data having the first attribute.

18 Claims, 13 Drawing Sheets

(58) Field of Classification Search
CPC .... G06F 18/214; G06F 16/285; G06F 18/241; G06F 30/00; G06F 16/22; G06F 18/15; G06F 18/217; G06F 18/22; G06F 18/24; G06F 18/254; G06F 18/28; G06F 18/40; H04L 63/0272; H04L 63/1425
See application file for complete search history.

(56) References Cited

U.S. PATENT DOCUMENTS

| | | | |
|---|---|---|---|
| 2020/0193285 | A1 | 6/2020 | Ishii |
| 2021/0073671 | A1 | 3/2021 | Puri et al. |
| 2022/0391762 | A1 | 12/2022 | Tokuchi |
| 2024/0177071 | A1 * | 5/2024 | Wang .................. G06N 3/0442 |

OTHER PUBLICATIONS

Viktoriia Sharmanska et al: "Contrastive Examples for Addressing the Tyranny of the Majority", arxiv.org, Cornell University Library, 201 Olin Library Cornell University Ithaca, NY 14853, Apr. 14, 2020 (Apr. 14, 2020), XP081643695, 16 pages.
Prasanna Sattigeri et al: "Fairness GAN", 1-15 arxiv.org, Cornell University Library, 201 Olin Library Cornell University Ithaca, NY 14853, May 24, 2018 (May 24, 2018), XP080882216, 13 pages.
Extended European Search Report issued Oct. 12, 2023, in corresponding European Patent Application No. 23171769.5, 9 pages.

* cited by examiner

MALE

| | A | B | C | D | TOTAL |
|---|---|---|---|---|---|
| NO. OF ITEMS | 220 | 100 | 100 | 80 | 500 |
| PROPORTION | 44% | 20% | 20% | 16% | 100% |

FEMALE

| | A | B | C | D | TOTAL |
|---|---|---|---|---|---|
| NO. OF ITEMS | 320 | 150 | 460 | 270 | 1200 |
| PROPORTION | 27% | 13% | 38% | 23% | 100% |

FIG.7

PRIOR TO AUGMENTATION

MALE

| | A | B | C | D | TOTAL |
|---|---|---|---|---|---|
| NO. OF ITEMS | 220 | 100 | 100 | 80 | 500 |
| PROPORTION | 44% | 20% | 20% | 16% | 100% |

MAINTAIN

POST AUGMENTATION

| | A | B | C | D | TOTAL |
|---|---|---|---|---|---|
| AUGMENTATION ITEM NO. | 308 | 140 | 140 | 112 | 700 |
| NO. OF ITEMS | 528 | 240 | 240 | 192 | 1200 |
| PROPORTION | 44% | 20% | 20% | 16% | 100% |

SAME NO. OF ITEMS

FEMALE

| | A | B | C | D | TOTAL |
|---|---|---|---|---|---|
| NO. OF ITEMS | 320 | 150 | 460 | 270 | 1200 |
| PROPORTION | 27% | 13% | 38% | 23% | 100% |

FIG.13

PRIOR TO AUGMENTATION

MALE

| | A | B | C | D | TOTAL |
|---|---|---|---|---|---|
| NO. OF ITEMS | 220 | 100 | 100 | 80 | 500 |
| PROPORTION | 44% | 20% | 20% | 16% | 100% |
| POSITIVE PREDICTION RATE | 20% | 30% | 10% | 10% | 25% |

MAINTAIN

RATE

POST AUGMENTATION

| | A | B | C | D | TOTAL |
|---|---|---|---|---|---|
| AUGMENTATION ITEM NO. | 308 | 140 | 140 | 112 | 700 |
| NO. OF ITEMS | 528 | 240 | 240 | 192 | 1200 |
| PROPORTION | 44% | 20% | 20% | 16% | 100% |
| POSITIVE PREDICTION RATE | 30% | 40% | 42% | 48% | 40% |

SAME NO. OF ITEMS

SAME POSITIVE PREDICTION RATE

FEMALE

| | A | B | C | D | TOTAL |
|---|---|---|---|---|---|
| NO. OF ITEMS | 320 | 150 | 460 | 270 | 1200 |
| PROPORTION | 27% | 13% | 38% | 23% | 100% |
| POSITIVE PREDICTION RATE | 30% | 40% | 42% | 48% | 40% |

TRAINING DATA GENERATION DEVICE AND METHOD

CROSS-REFERENCE TO RELATED APPLICATION

This application is based upon and claims the benefit of priority of the prior Japanese Patent Application No. 2022-087670, filed on May 30, 2022, the entire contents of which are incorporated herein by reference.

FIELD

The embodiments discussed herein are related to a non-transitory recording medium storing a training data generation program, a training data generation device, and a training data generation method.

BACKGROUND

Recently there are often demands in machine learning methods for large scale data as training data to train machine learning models. However, there are often cases in which it is difficult to collect together a sufficient number of training data. To address this issue, some prepared training data is converted to generate new training data, thereby augmenting the number of training data.

For example, there is a proposal for a data generation device that generates supervised data capable of building an analysis model with a high degree of generalizability. In this device, when classifying a first supervised data into specific categories using a trained analysis model, a characteristic site contributing to classification into a specific category is detected in the first supervised data, and second supervised data is generated by manipulating the first supervised data according to the characteristic site.

Moreover, for example, there is a proposal for a neural network learning device that extracts a feature from training data using a neural network undergoing training, and uses the neural network undergoing training to generate an adversarial feature from the extracted feature. This device uses the training data and the adversarial feature to compute a recognition result of the neural network, and trains the neural network such that the recognition result is close to a desired output.

Moreover, for example, there is a proposal for a system that augments a training sample for a minority class in a machine learning model using unbalanced training samples. In this system a training sample value is selected from a training sample set, a combination ratio value is selected from a continuous probability distribution, and selected training sample values are modified using the combination ratio value. This system generates a synthesized training sample by combining the modified training sample values.

Moreover, for example, there is a proposal for a system that generates a set of data samples of a minority data class to balance up an unbalanced training data set including both a majority data class and a minority data class. For example, related arts are disclosed in International Publication (WO) No. 2021/130995, International Publication (WO) No. 2018-167900, United States Patent Application Laid-Open No. 2021/0073671 and United States Patent Application Laid-Open No. 2015/0088791

SUMMARY

According to an aspect of the embodiments, a non-transitory recording medium storing a program that causes a computer to execute a training data generation process comprising: classifying, based on a feature value, each of a first plurality of training data having a first attribute and each of a second plurality of training data having a second attribute that are contained in a plurality of training data; based on a comparison of a number of training data classified in a first group from among the first plurality of training data against a number of training data classified in a second group from among the first plurality of training data, selecting a third plurality of training data from training data classified in a third group from among the second plurality of training data and training data classified in a fourth group from among the second plurality of training data, the third group corresponding to the first group, the fourth group corresponding to the second group; and converting each of the third plurality of training data into a fourth plurality of training data having the first attribute.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram to explain computation of an augmentation item number of each similarity group.

FIG. 13 is a diagram to explain another example of computation of an augmentation item number of each similarity group.

DESCRIPTION OF EMBODIMENTS

Explanation follows regarding an example of an exemplary embodiment according to technology disclosed herein, with reference to the drawings.

Figure 1:
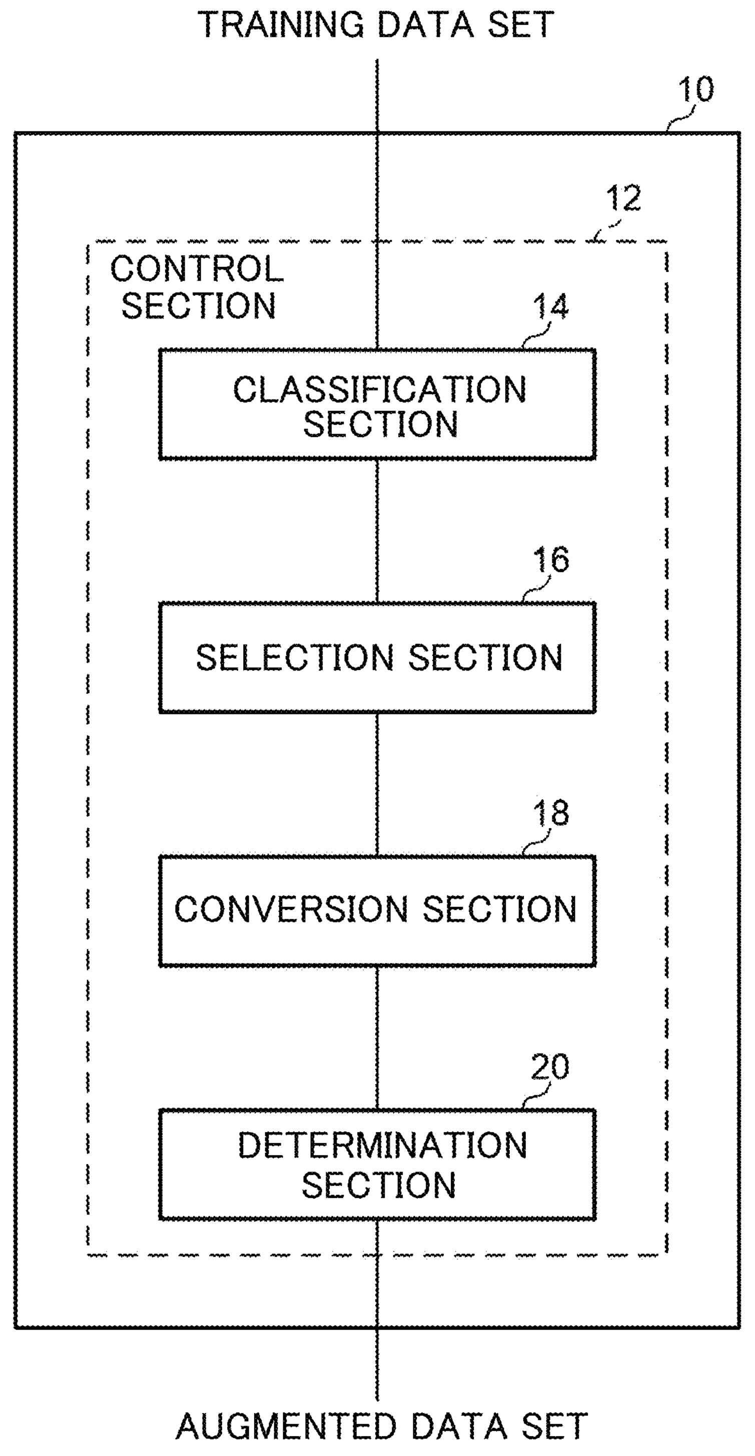
FIG. 1 is a functional block diagram of a training data generation device.

As illustrated in FIG. 1, a training data generation device 10 according to the present exemplary embodiment is input with a training data set for use in training of machine learning. The training data generation device 10 converts training data included in the training data set so as to generate new training data (hereafter also referred to as "augmentation data"). The training data generation device 10 outputs an augmented data set of the generated augmentation data added to the input training data set.

When respective training data have been divided into groups based on one or other attribute of each training data in the training data set, sometimes this results in an imbalance in data size between groups, namely in an imbalance in the number of training data included in each group. In cases in which a machine learning model has been trained using a training data set having an imbalance in the number training data due to an attribute to be considered for fairness (hereafter referred to as a "sensitive attribute"), there is a high probability that prediction results from such a machine learning model will be discriminatory. There is accordingly a desire to rectify such an imbalance in data size in the training data set. In the following, in group division based on a sensitive attribute, a group having a large data size is referred to as a "majority group", and data for the majority group is referred to as "majority data". Moreover, a group having a small data size is referred to as a "minority group", and data for the minority group is referred to as "minority data".

Moreover, in cases in which there is an imbalance in data size for respective groups resulting from classifying training data by a sensitive attribute, a drop in prediction accuracy by the machine learning model more readily occurs for minority data compared to majority data due to there being less training data for the minority group. There is accordingly a demand to raise the prediction accuracy of the minority group by augmenting the data.

Figure 2:
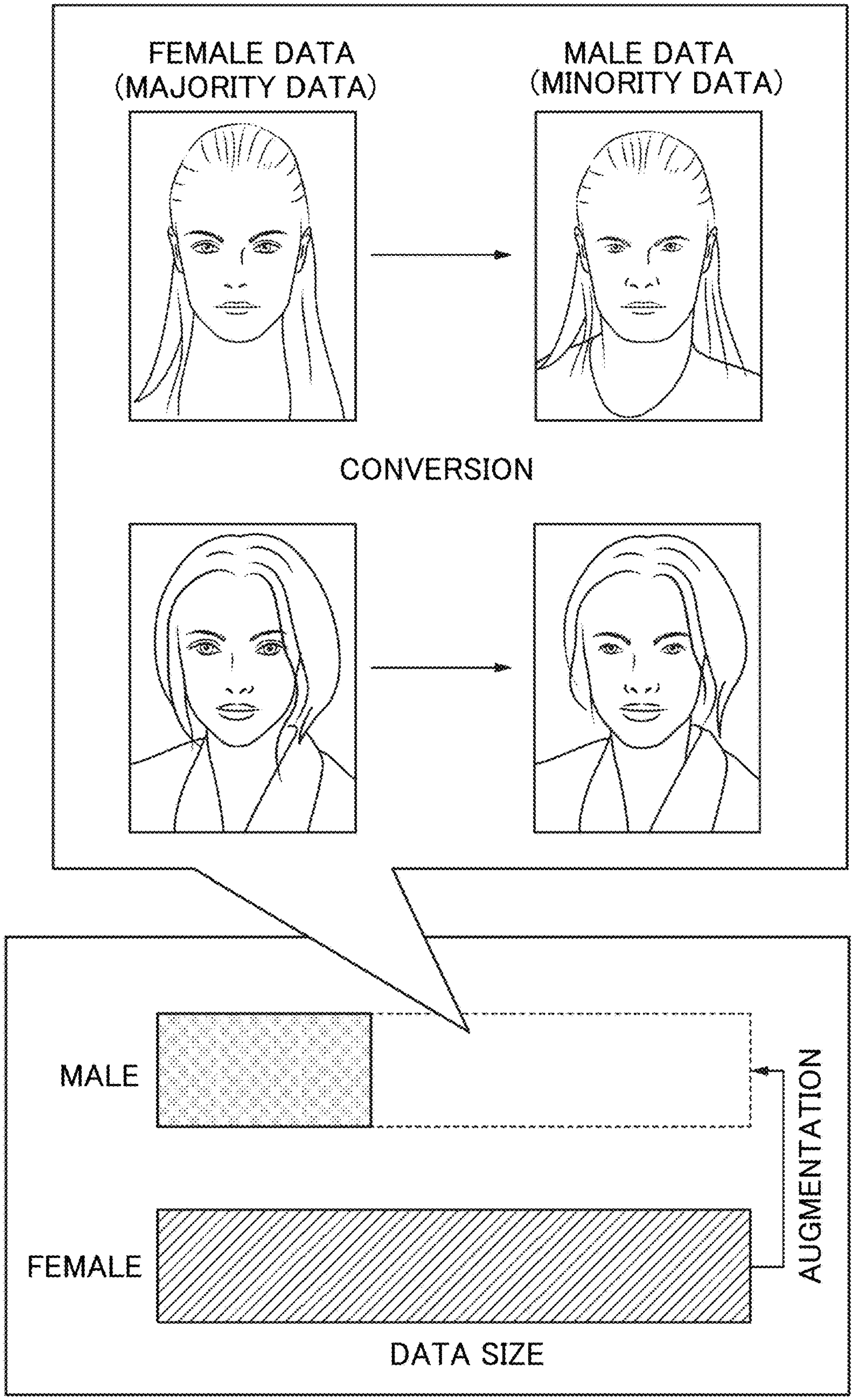
FIG. 2 is a diagram to explain a first reference example.

The following first reference example might be considered as a method to augment minority group data. Consider for example, as illustrated in FIG. 2, a case in which training data is facial images of people. Suppose in such a case that when the training data is divided into groups by a sensitive attribute "gender (male, female)", a group of male gender (hereafter referred to as "male group") is a minority group. Moreover, suppose a group of female gender (hereafter referred to as "female group") is a majority group. In the first reference example, facial images in the training data of the female group that is the majority data (hereafter also referred to as "female data") is converted into masculine facial images, and treated as training data of the male group that is the minority data (hereafter also referred to as "male data"). Thus in the first reference example, the minority group is augmented thereby, so that the data sizes in both the majority group and the minority group become equivalent to each other. However, in the first reference example an issue arises in that, in cases in which a feature for a prediction task is different between groups, then data having such a feature is not able to be augmented. For example, as illustrated in the example of FIG. 2, although conversion has been performed such that post conversion facial images have a facial expression with masculine characteristics, sometimes a hair style having feminine characteristics remains. In such situations, for example, the prediction accuracy of the male group is not raised in a task in which long hair is a positive predictor of being female, and short hair is a positive predictor of being male.

Figure 3:
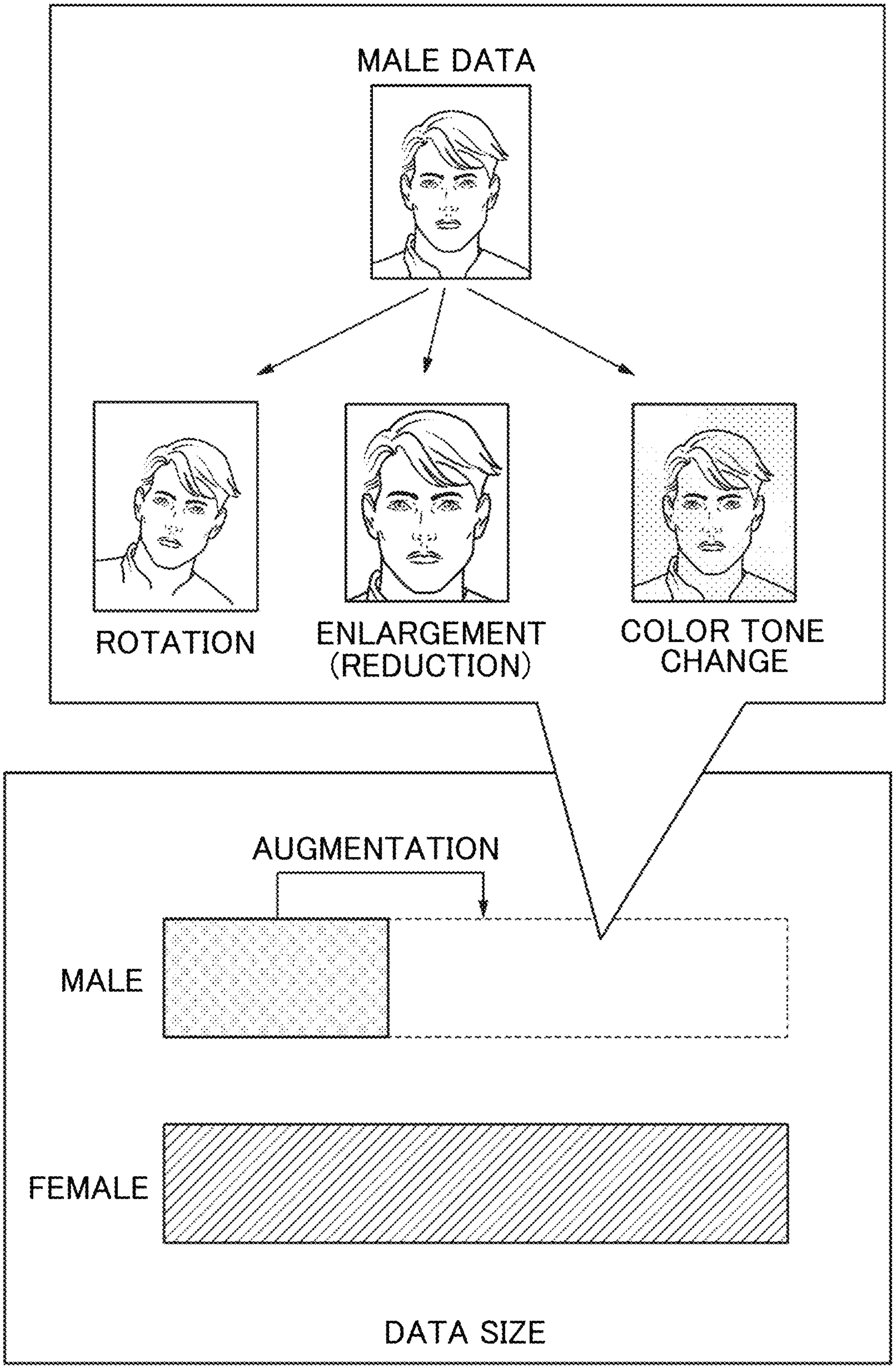
FIG. 3 is a diagram to explain a second reference example.

Moreover, the following second reference example might be considered as a method for augmenting minority group data. In the second reference example, for example as illustrated in FIG. 3, a minority group is augmented by generating new data resulting from performing processing such as rotation, enlargement, reduction, color tone change, or the like on minority data. However, in the second reference example the training data of the same example is increased, with this resulting in an issue that there is liable to be a lack of diversity in characteristics of the training data for the minority group post augmentation, and overtraining is liable to occur.

Figure 4:
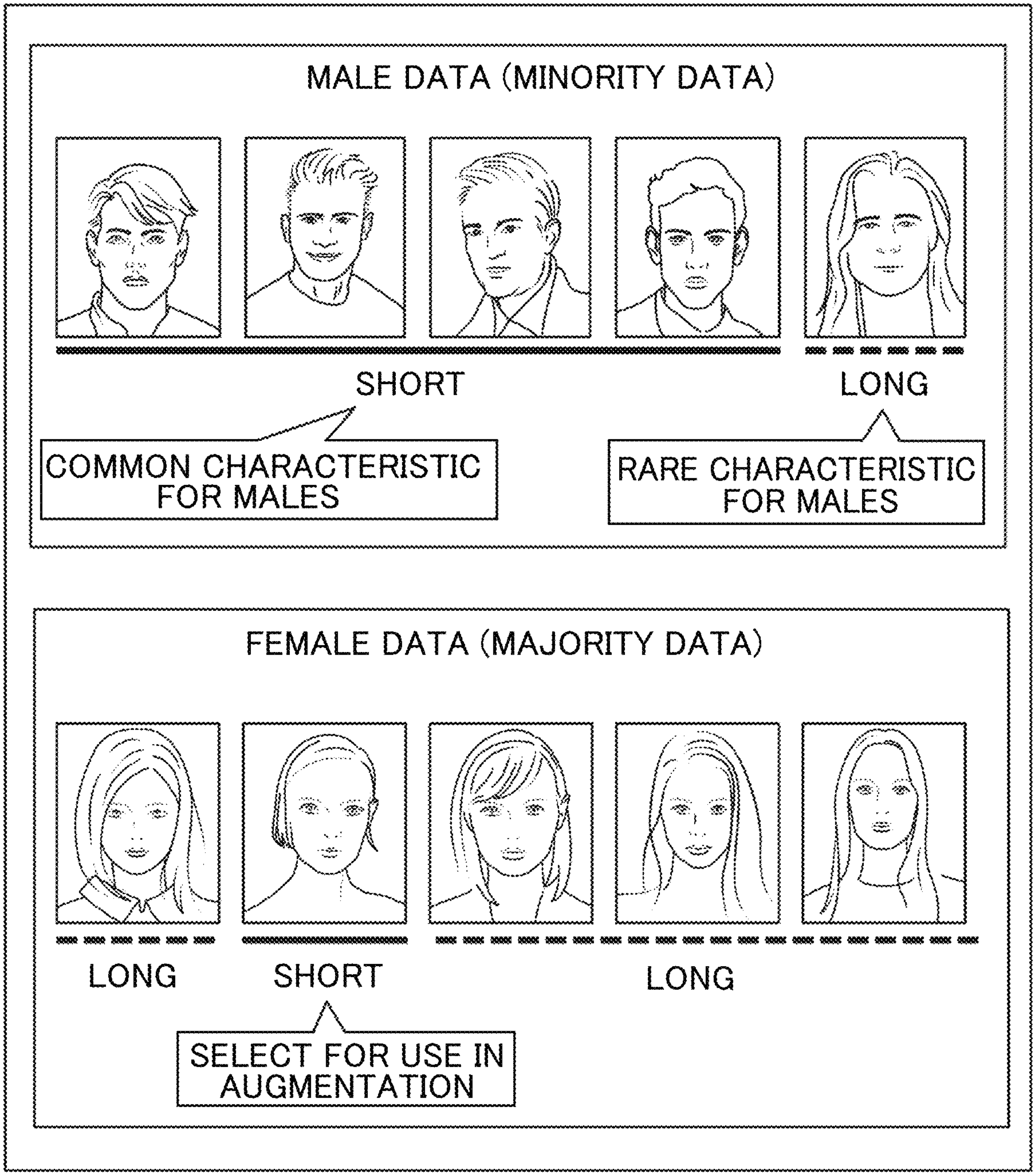
FIG. 4 is a diagram to explain a focus of the present exemplary embodiment.

In order to address this issue, the present exemplary embodiment proposes a method of data augmentation so as to have a diversity of expression while maintaining characteristics of the minority data. The present exemplary embodiment focuses on the fact that training data having characteristics similar to those of the minority data are also sometimes contained in the majority group. For example, as illustrated in FIG. 4, a characteristic of the male data that is the minority data is that instances of short hair are more common than instances of long hair. In such cases, the training data generation device 10 according to the present exemplary embodiment preferentially selects from the female data that is the majority data any facial images with short hair to be used in augmentation. Moreover, the training data generation device 10 also suppresses a divergence in the label to be predicted by the machine learning model from a distribution of a feature in the training data. For example, in the male group, in cases in which training data of straight, short hair makes up 30% of the entire training data for the male group, the training data generation device 10 performs data augmentation such that this proportion is not changed after augmentation.

Detailed explanation follows regarding functional sections of the training data generation device 10 according to the present exemplary embodiment. Note that a specific example of the present exemplary embodiment will be described for a case that envisages a task of predicting whether or not a facial image of a person is "attractive". Moreover, gender is used as the sensitive attribute, and a small difference in prediction accuracy between male and female is considered to be fair. Furthermore, the present exemplary embodiment envisages a case in which there is an insufficient number of training data for the male group, and the number of training data for the male group is also less than the number of training data for the female group. Namely, the case presumes that the male data is minority data and the female data is majority data. Note that in the present task, whether or not a facial image is "attractive" is presumed to be strongly influenced by characteristics of hair style.

As illustrated in FIG. 1, the training data generation device 10 includes, from a functional perspective, a control section 12. More specifically, the control section 12 includes a classification section 14, a selection section 16, a conversion section 18, and a determination section 20.

The classification section 14 performs classification based on a feature value respectively into a first plural number of training data having a first attribute and into a second plural number of training data having a second attribute that are contained in the training data set. The first attribute is male and the second attribute is female. Namely, the first plural number of training data are training data classified in a male group that is the minority group, and the second plural number of training data is training data classified in a female group that is the majority group.

Figure 5:
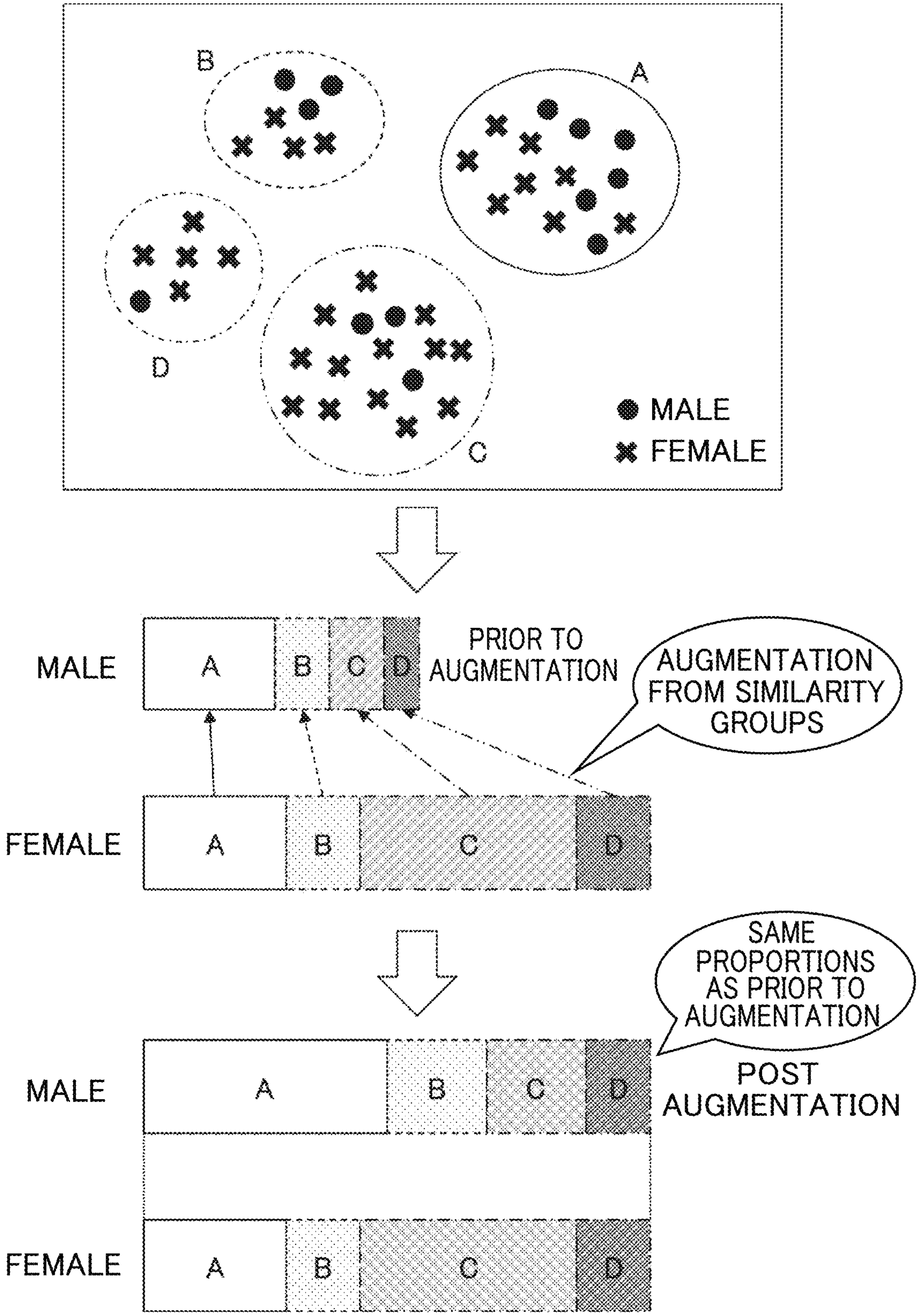
FIG. 5 is a diagram to explain an outline of processing of the present exemplary embodiment.

More specifically, the classification section 14 extracts a feature value from each instance of training data. For example, in cases in which each training data has been input to a deep neural network, which is an example of a machine learning model, the classification section 14 extracts as a feature value of the training data, a value output from at least one among a middle layer or an output layer of the deep neural network. The classification section 14 subjects the training data to clustering based on similarity of a feature value, as illustrated at an upper part of FIG. 5. In the example of FIG. 5, male data is represented by black circles, and female data is represented by crosses. In the following, a group classified by the clustering based on similarity of the feature value is referred to as a "similarity group". The example of FIG. 5 illustrates an example in which the training data has been classified into one or other among 4 similarity groups called A, B, C, and D. In cases in which a feature value is employed as described above there is a tendency to divide groups according to hair style characteristics such that are, for example, the similarity group A: short A straight hair, the similarity group B: short A curly hair, the similarity group C: long A wavy hair, and the similarity group D: long A straight hair.

The selection section 16 compares a number of training data classified in a first similarity group from among the minority data against a number of training data classified in a second similarity group therefrom. Based on this comparison, the selection section 16 selects, from among the majority data, training data to be used for augmentation from training data classified in a third similarity group corresponding to the first similarity group. Moreover, from among the majority group training data, the selection section 16 selects training data to be used for augmentation from training data classified in a fourth similarity group corresponding to the second similarity group. Note that the training data to be used for augmentation is an example of "a third plurality of training data" of technology disclosed herein. Moreover, the present exemplary embodiment will be described for a case in which the first similarity group and the third similarity group are the same as each other, and the second similarity group and the fourth similarity group are the same as each other.

Figure 6:
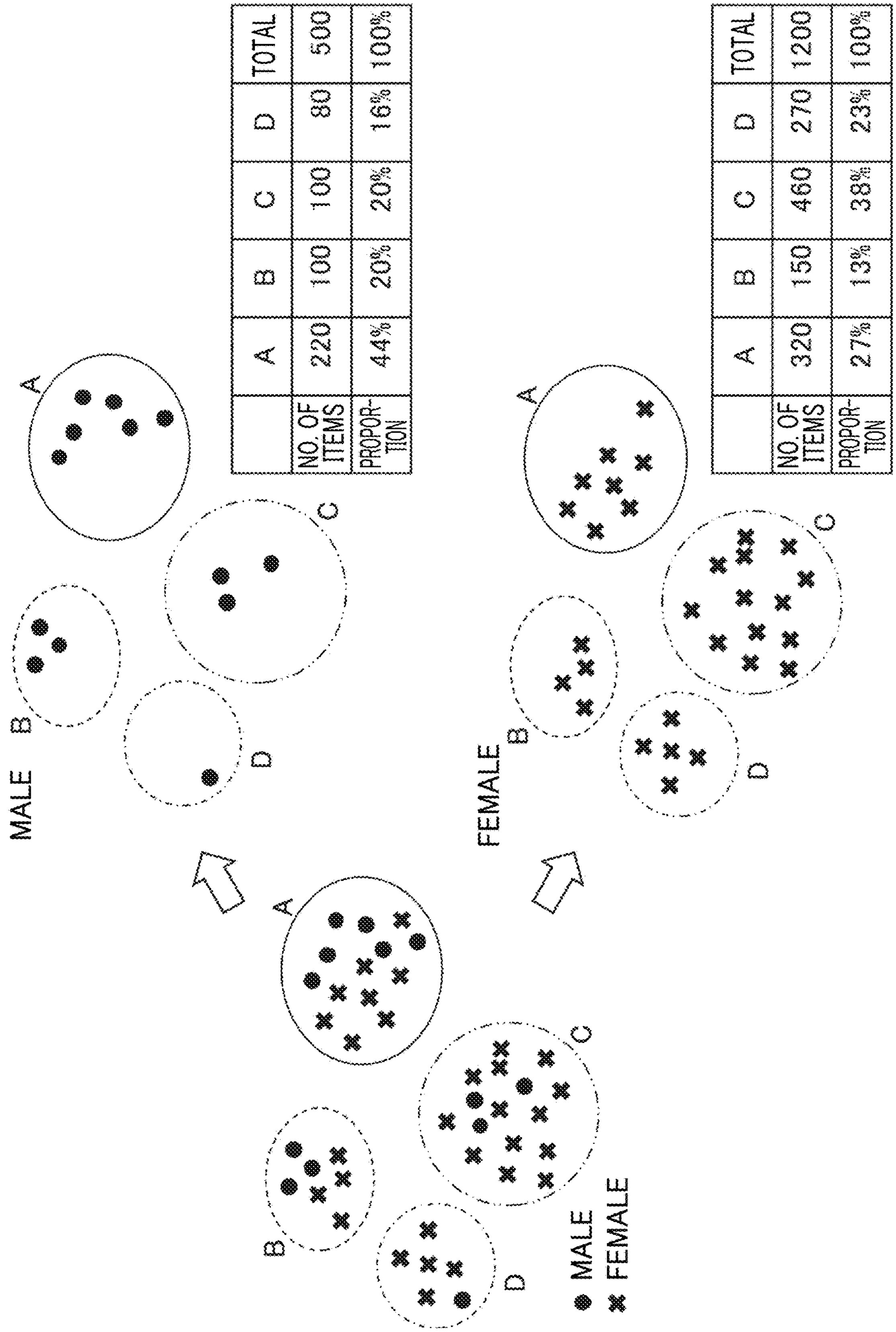
FIG. 6 is a diagram to explain computation of a proportion of items for each similarity group.

More specifically, as illustrated in FIG. 6, the selection section 16 tallies the number of minority data (male data) classified in each of the similarity groups, and computes a proportion for each of the similarity groups. The proportion is computed as the number of minority data classified in each similarity group/total number of minority data (data size of minority group). Moreover, the selection section 16 tallies the total number of majority data (female data) (data size of majority group). Note that in the example of FIG. 6, for reference, the number of items and proportion for each similarity group is also indicated for the female group that is the majority group.

As illustrated in FIG. 7, the selection section 16 computes an augmentation item number of each similarity group in the minority group so as to maintain the computed proportions, while making the minority group data size equivalent to the majority group data size. Note that FIG. 7 illustrates a case in which the augmentation item number is computed so as to make the number of items in the post augmentation minority group the same as the number of items in the majority group. However, making data sizes equivalent does not just refer to cases in which the number of data are the same in the minority group and the majority group, and also includes cases in which a difference between the minority group data size and the majority group data size is a difference lying within a first threshold. The first threshold is pre-determined as a value at which the minority group data size can be taken equivalent to the majority group data size. The selection section 16 selects a number of the majority data corresponding to the computed augmentation item number of each similarity group by selecting from each corresponding similarity group as the training data to be used in augmentation.

Figure 8:
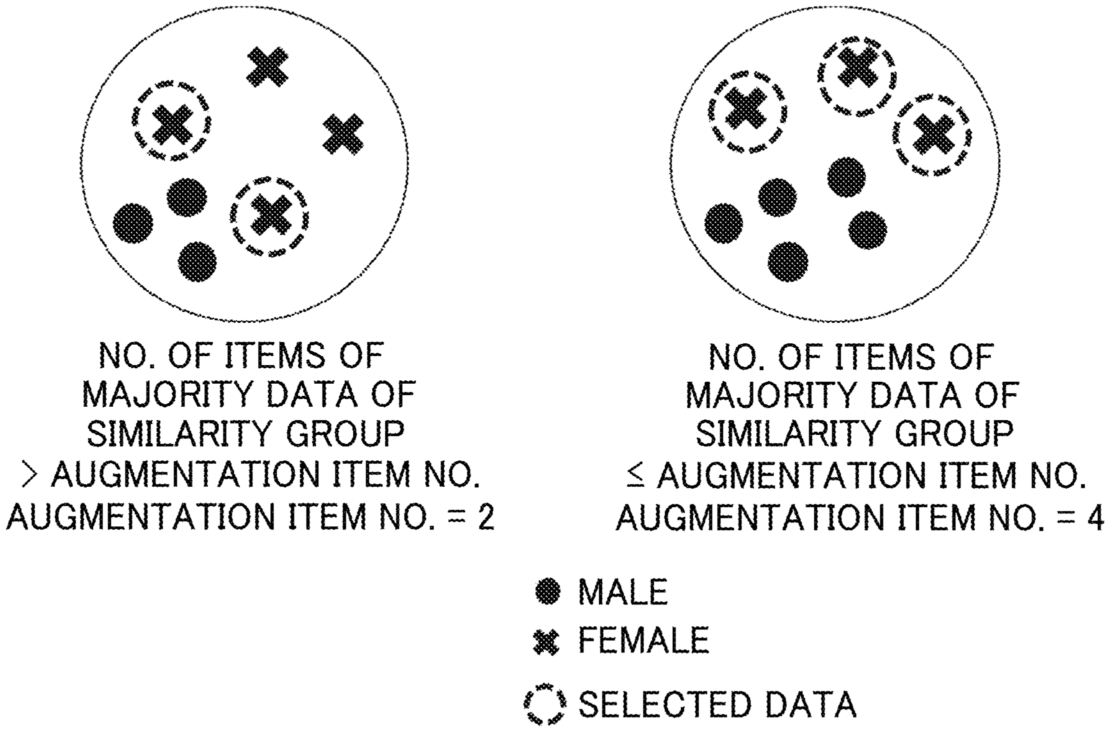
FIG. 8 is a diagram to explain selection of minority data according to the augmentation item number.

More specifically as illustrated on the left of FIG. 8, in cases in which the number of majority data classified in a given same similarity group is greater than the computed augmentation item number of this same similarity group, the selection section 16 selects the computed augmentation item number amount from the majority data for this similarity group. The example on the left of FIG. 8 illustrates a case in which the number of majority data classified in the same similarity group is four, and the computed augmentation item number is two. In such a case the selection section 16 selects two the majority data from this similarity group. When doing so, the selection section 16 selects, from the majority data classified in this same similarity group, an amount of the augmentation item number of the majority data in sequence from the highest similarity to the minority data classified in this similarity group. The selection section 16 may, for example, employ a distance between a cluster center of minority data in this similarity group to each majority data as the similarity of the majority data to the minority data.

Moreover, as illustrated at the right of FIG. 8, in cases in which the number of majority data classified in a given same similarity group is not greater than the computed augmentation item number of this same similarity group, the selection section 16 selects all majority data in this same similarity group. The example on the right of FIG. 8 illustrates a case in which there are three majority data classified in the same similarity group, and the computed augmentation item number is four. In such cases the selection section 16 selects all three majority data from the same similarity group.

Figure 9:
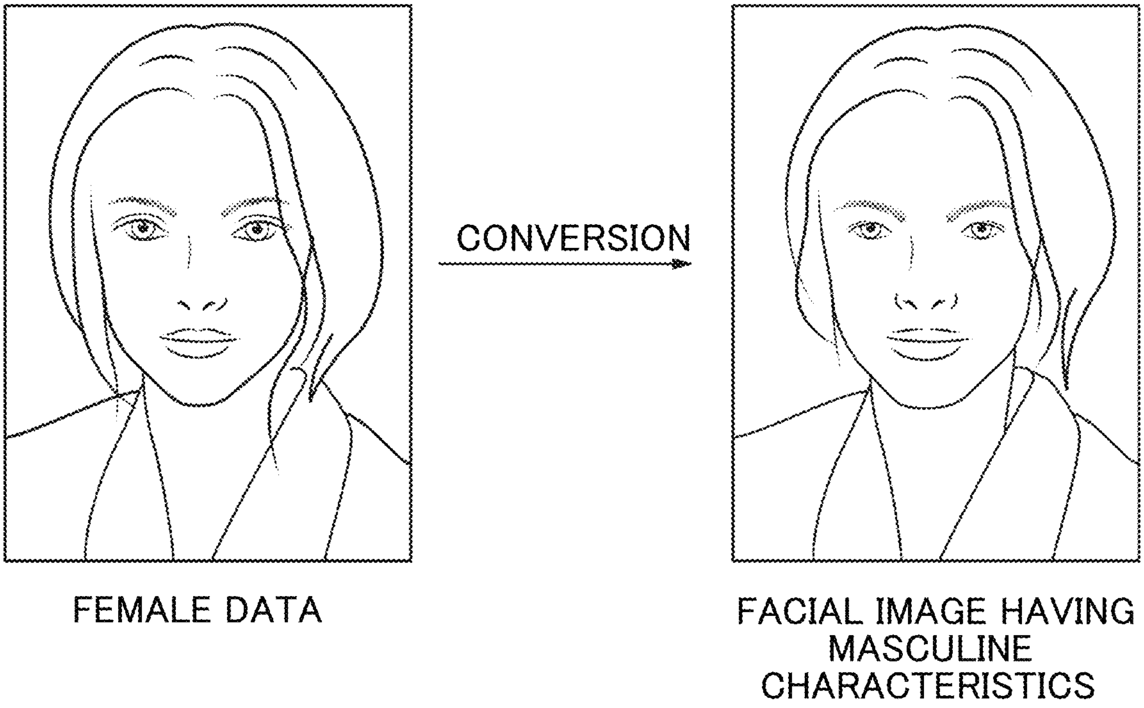
FIG. 9 is a diagram to explain data conversion.

The conversion section 18 respectively converts each the majority data selected by the selection section 16 as the training data to be used in augmentation by conversion into data having the first attribute, namely, having characteristics of an attribute of the minority group. More specifically as illustrated in FIG. 9, the conversion section 18 converts female data (facial images) that are the majority data into facial images having masculine characteristics. For example, the conversion section 18 performs image conversion using a generation model already subjected to machine learning, such as a generative adversarial network (GAN). Note that data post conversion by the conversion section 18 is an example of "a fourth plurality of training data" of technology disclosed herein.

The conversion section 18 is able to perform augmentation that considers a feature of minority data due to employing majority data of the same similarity group in augmentation, as illustrated at the middle of FIG. 5. Moreover, as illustrated at the bottom of FIG. 5, the conversion section 18 is also able to maintain an imbalance in a feature of the minority group due to augmenting the minority group so as to have an equivalent data size to the majority data size while maintaining a proportion of the number of items in each original similarity group.

Figure 10:
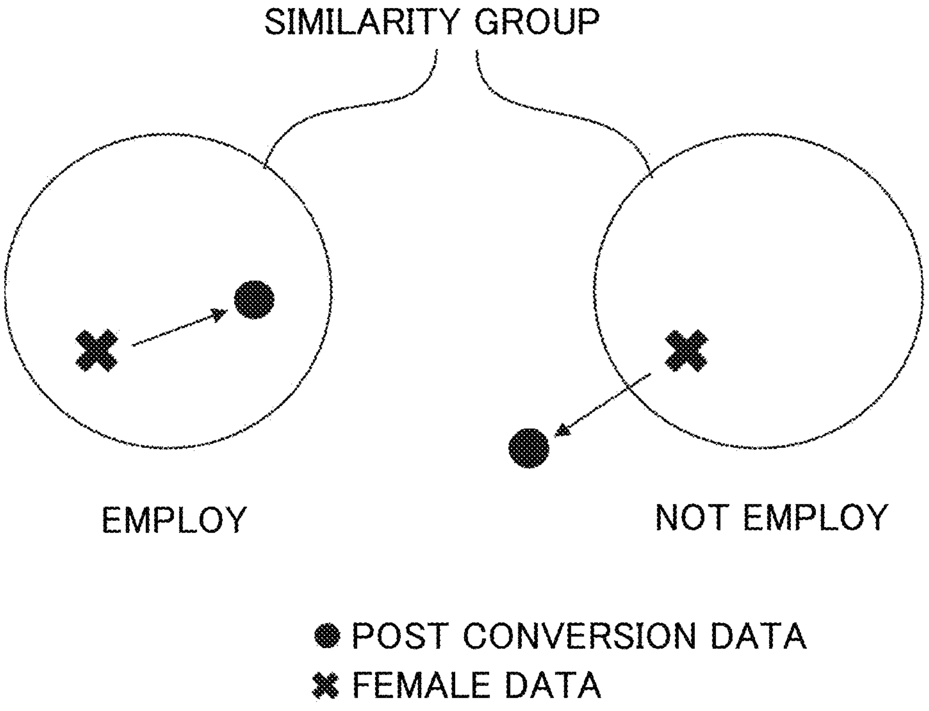
FIG. 10 is a diagram to explain determination as to whether or not to employ post conversion data as augmentation data.

The determination section 20 determines whether or not to employ the data converted by the conversion section 18 as the augmentation data. More specifically, as illustrated in FIG. 10, the determination section 20 employs the post conversion data as augmentation data in cases in which this post conversion data is classifiable in the same similarity group to the similarity group of the majority data prior to conversion. However, the determination section 20 does not employ the post conversion data as augmentation data in cases in which this post conversion data is not classifiable in the same similarity group to the similarity group of the majority data prior to conversion. For example, the conversion section 18 determines whether or not the post conversion data is classifiable in the same similarity group by employing the post conversion data in the classification model generated when clustering was performed by the classification section 14. Moreover, the conversion section 18 may, for example, determine whether or not the post conversion data is classifiable in the same similarity group by whether or not a distance from a cluster center of this same similarity group to the post conversion data is a specific value or greater.

The determination section 20 removes post conversion data determined not for employing as augmentation data from a group of post conversion data, and takes the remaining data as augmentation data. Note that, as illustrated in FIG. 8, sometimes there is unselected majority data still present when the majority data has been selected by the selection section 16. In such cases, the determination section 20 may cause the selection section 16 to reselect different majority data to the original majority data that was subsequently determined to be data not for employing as augmentation data. The determination section 20 outputs, as the augmented data set, an augmented data set in which the augmentation data has been added to the original training data set.

Figure 11:
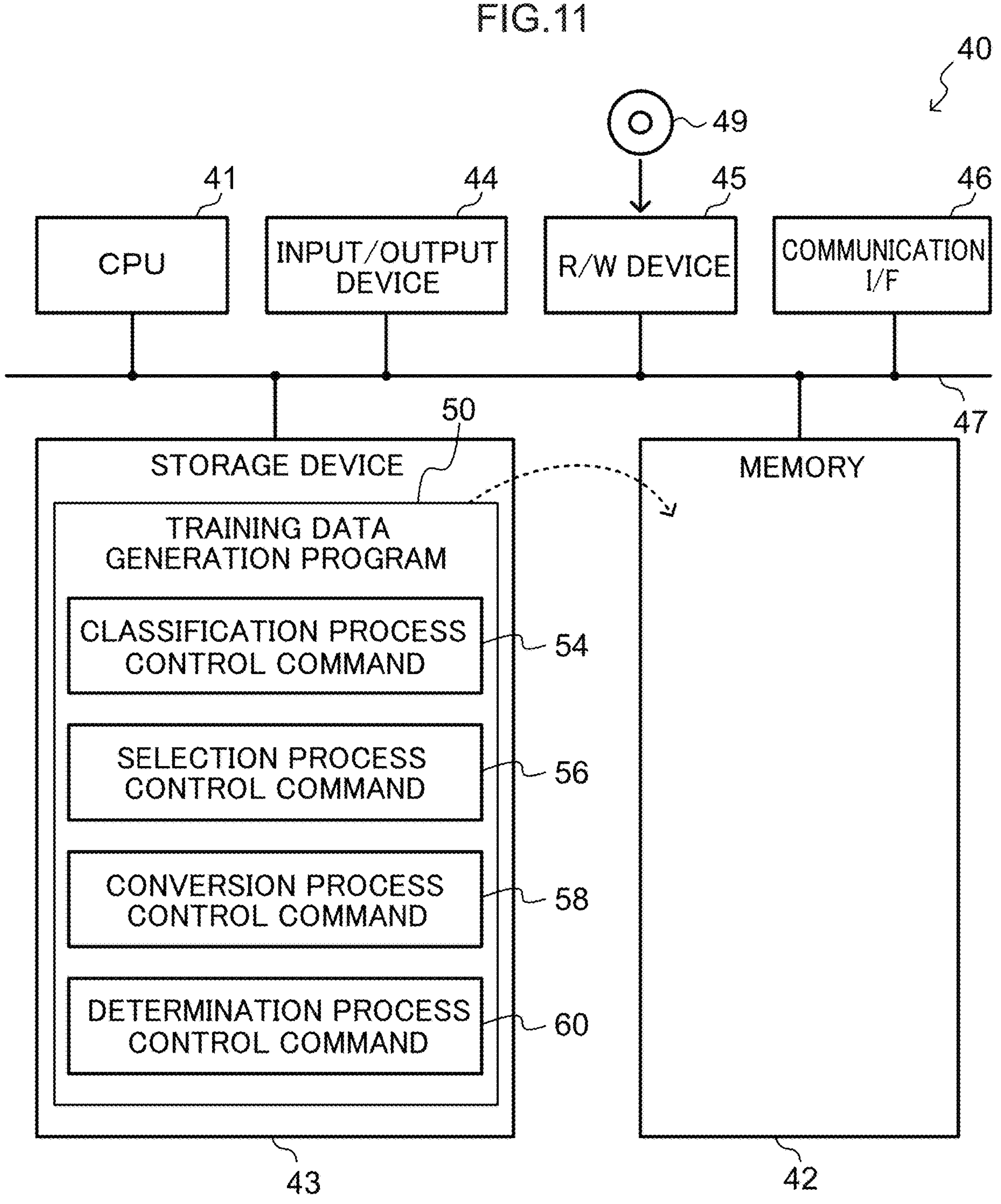
FIG. 11 is block diagram illustrating a schematic configuration of a computer that functions as a training data generation device.

The training data generation device 10 may, for example, be implemented by a computer 40 as illustrated in FIG. 11. The computer 40 includes a central processing unit (CPU) 41, memory 42 serving as transient storage space, and a non-transient storage device 43. The computer 40 also includes an input/output device 44 such as an input device, a display device, or the like, and a read/write (R/W) device 45 for controlling reading of data from a storage medium 49 and writing of data thereto. The computer 40 also includes a communication interface (I/F) 46 connected to a network such as the Internet. The CPU 41, the memory 42, the storage device 43, the input/output device 44, the R/W device 45, and the communication I/F 46 are connected to each other through a bus 47.

The storage device 43 is, for example, a hard disk drive (HDD), solid state drive (SSD), or flash memory. A training data generation program 50 that causes the computer 40 to function as the training data generation device 10 is stored on the storage device 43 serving as a storage medium. The training data generation program 50 includes a classification process control command 54, a selection process control command 56, a conversion process control command 58, and a determination process control command 60.

The CPU 41 reads the training data generation program 50 from the storage device 43, expands the training data generation program 50 into the memory 42, and sequentially executes the control commands of the training data generation program 50. The CPU 41 operates as the classification section 14 illustrated in FIG. 1 by executing the classification process control command 54. The CPU 41 operates as the selection section 16 illustrated in FIG. 1 by executing the selection process control command 56. The CPU 41 operates as the conversion section 18 illustrated in FIG. 1 by executing the conversion process control command 58. The CPU 41 operates as the determination section 20 illustrated in FIG. 1 by executing the determination process control command 60. The computer 40 that has executed the training data generation program 50 accordingly functions as the training data generation device 10. Note that the CPU 41 executing the program is hardware.

Note that the functionality implemented by the training data generation program may be implemented by, for example, a semiconductor integrated circuit, and more particularly by an application specific integrated circuit (ASIC).

Figure 12:
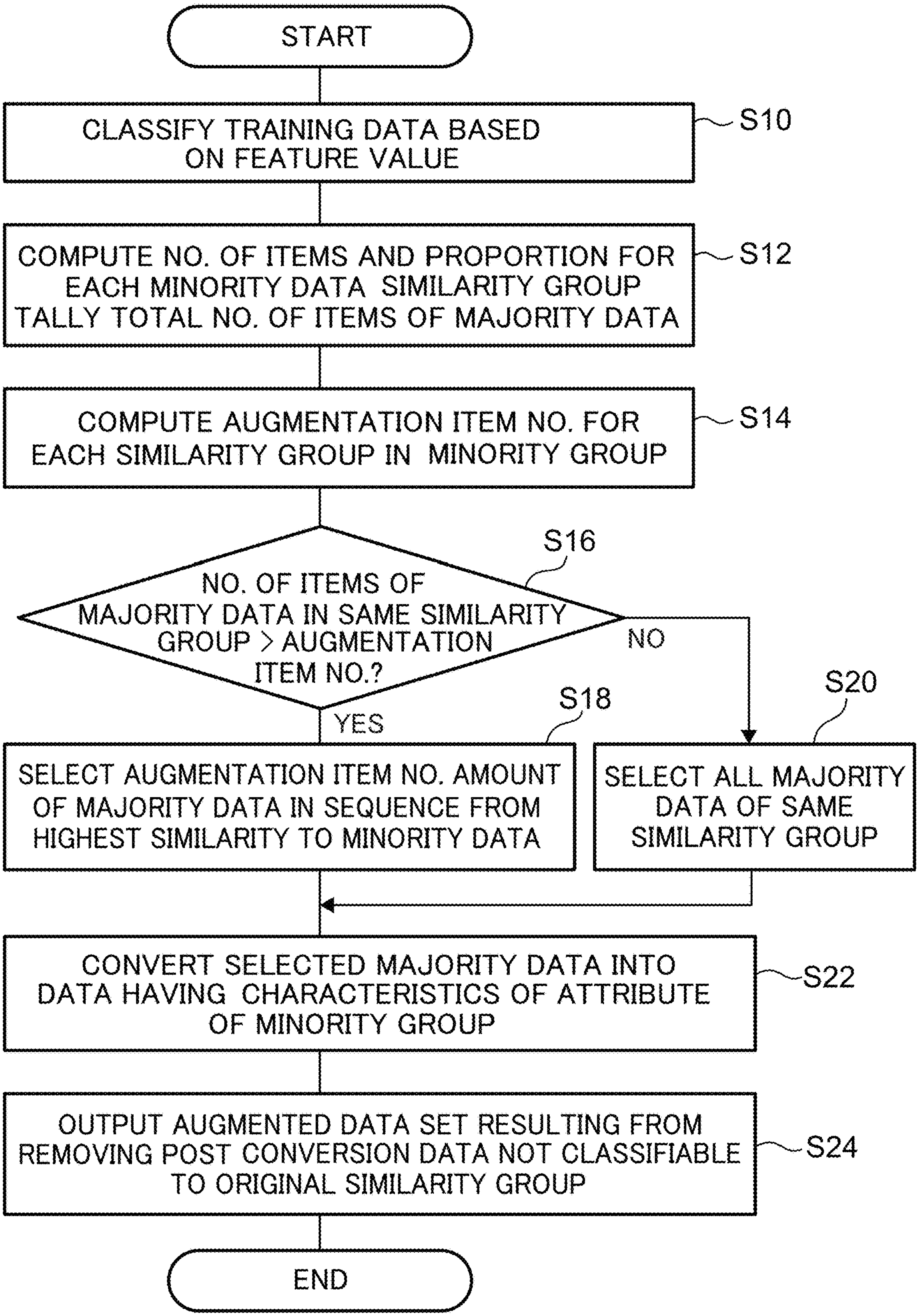
FIG. 12 is a flowchart illustrating an example of training data generation processing.

Next, description follows regarding operation of the training data generation device 10 according to the present exemplary embodiment. Training data generation processing illustrated in FIG. 12 is executed in the training data generation device 10 when a training data set has been input to the training data generation device 10 and augmentation data generation is instructed. Note that the training data generation processing is an example of a training data generation method of technology disclosed herein.

At step S10, the classification section 14 acquires the training data set that has been input to the training data generation device 10. The classification section 14 then extracts a feature value from each training data, and classifies each training data into one or other similarity group by clustering the training data based on similarity of feature value.

Next at step S12, the selection section 16 tallies the number of minority data classified in each similarity group, and computes a proportion of the number of items in each similarity group. The selection section 16 also tallies the total number of majority data. Next at step S14, the selection section 16 computes an augmentation item number of each similarity group so as to make the data size of the minority group equivalent to the data size of the majority group while maintaining the computed proportions in the minority group.

Next at step S16, the selection section 16 determines for each of the similarity groups whether or not the number of majority data classified in the same similarity group are greater than the computed augmentation item number of this similarity group. Processing transitions to step S18 in cases in which there is a greater number of items in the majority data, and processing transitions to step S20 in cases in which the augmentation item number is the number of the minority data or greater.

At step S18, the selection section 16 selects, from among the majority data classified in a given same similarity group, an amount of the augmentation item number of the majority data in sequence from the highest similarity to the minority data classified in this same similarity group. At step S20, the selection section 16 selects all the majority data in the same similarity group. Note that the processing of step S16 to step S20 is executed for each of the similarity groups.

Next, at step S22, the conversion section 18 respectively converts each the majority data selected at step S18 of step S20 into data having characteristics of an attribute of the minority group. Next at step S24, in cases in which the post conversion data is not classified in the same similarity group as the similarity group of the majority data prior to conversion, the determination section 20 removes this post conversion data from the post conversion data group, and outputs the remaining data as an augmented data set. The training data generation processing is then ended.

As described above, in the training data generation device according to the present exemplary embodiment, a training data set is classified into similarity groups based on a feature value of both minority data and majority data contained in the training data set and related to a sensitive attribute. The training data generation device then computes an augmentation item number of each of the similarity groups for augmenting the minority group to the total number of the majority group while maintaining the proportions of number of items for each similarity group in the minority group. The training data generation device also selects, as data to be used for augmenting each similarity group, data of the amount of the computed augmentation item number from the majority data of the same similarity group. The training data generation device then converts the selected majority data into data having characteristics of an attribute of the minority group so as to generate augmentation data. This thereby enables generation of a training data set after data augmentation to rectify fairness by generating a post augmentation training data so as to maintain an imbalance of characteristics of the training data set prior to augmentation. The prediction accuracy of the minority group is also raised due to generating the augmentation data by converting the majority data with similarity to the feature of the minority data.

Note that there are various fairness indices around due to there being various ways of thinking about and criterion of fairness. The exemplary embodiment described above presumes matching prediction accuracy to be an impartial accuracy parity index. Thus in the exemplary embodiment described above, data augmentation is performed such that the data size is equivalent across groups classified by a sensitive attribute. Another representative fairness index is, for example, a demographic parity index. Such an index is an impartial index in which the rate of positive predictions matched across the sensitive attribute groups. In such cases, as illustrated in FIG. 13, the selection section selects training data for use in augmentation from the majority group of the same similarity group such that the rate of positive predictions for each similarity group of the minority group is at the same level as in the majority group for the same similarity group.

More specifically, similarly to in the exemplary embodiment described above, the selection section computes the augmentation item number of each of the similarity groups so as to make the data sizes equivalent for the minority group and the majority group while maintaining the proportions of the number of each similarity group in the minority group. The selection section then, when selecting majority data for each similarity group from the same similarity group, selects majority data such that the rate of positive predictions for this similarity group is equivalent. However, the rate of positive predictions being equivalent does not only mean cases in which the rate of positive predictions is the same for both the minority group and the majority group, but also includes cases in which a difference between the rate of positive predictions for the minority group and the rate of positive predictions for the majority group is a difference lying within a second threshold or within a third threshold. The second threshold and the third threshold are thresholds for each similarity group, and are values predetermined such that the rate of positive predictions of the minority group and the rate of positive predictions of the majority group can be taken equivalent. More specifically, the selection section preferentially selects for positive predictions in the majority data in cases in which the rate of positive predictions of the minority group is lower than the rate of positive predictions of the majority group. However, the selection section preferentially selects for negative predictions of in the majority data in cases in which the rate of positive predictions of the minority group is higher than the rate of positive predictions of the majority group.

Moreover although the training data generation program is pre-stored (installed) on the storage device in the exemplary embodiment described above, there is no limitation thereto. The program according to the technology disclosed herein may be provided in a format stored on a storage medium such as CD-ROM, DVD-ROM, USB memory, or the like.

Related technology considers augmenting training data for a minority group based on training data of a majority group to rectify fairness in training data. However, in the related technology, in cases in which there is an imbalance in a feature between training data of the minority group and training data of the majority group, the originally existing imbalance in the feature of the minority group is lost. Then in cases in which the originally existing imbalance in the feature of the minority group is no longer maintained after augmentation, there is a possibility that the prediction accuracy of the machine learning models will fall for the minority group.

The technology disclosed herein enables a training data set after data augmentation to rectify fairness to be generated as post augmentation training data based on an imbalance of features in the training data set prior to augmentation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a program that causes a computer to execute a training data generation process comprising:

classifying, based on a feature value, each of a first plurality of training data, which are minority data having a first attribute, and each of a second plurality of training data, which are majority data having a second attribute that are contained in an original plurality of training data;

based on a comparison of a number of training data classified in a first group from among the first plurality of training data against a number of training data classified in a second group from among the first plurality of training data, selecting a third plurality of training data from training data classified in a third group from among the second plurality of training data and training data classified in a fourth group from among the second plurality of training data, the third group corresponding to the first group, the fourth group corresponding to the second group;

converting each of the third plurality of training data into a fourth plurality of training data having the first attribute; and generating an augmented data set by adding the fourth plurality of training data to the original plurality of training data.

2. The non-transitory recording medium of claim 1, wherein the selecting of the third plurality of training data includes:

calculating an augmentation item number for each of the first group and the second group in a case in which the number of training data is to be augmented in each of the first group and the second group, wherein a difference between a total number of training data classified in the first group and the second group and a total number of training data classified in the third group and the fourth group from the second plurality of training data is a difference lying within a first threshold while maintaining a proportion of a number of training data classified in the first group to a number of training data classified in the second group from among the first plurality of training data; and selecting for the third group and for the fourth group a respective number of training data corresponding to the augmentation item number.

3. The non-transitory recording medium of claim 2, wherein the selecting of the third plurality of training data includes:

selecting training data classified in the third group, wherein a difference between a rate of positive prediction of training data classified in the first group and a rate of positive prediction of training data classified in the third group is a difference lying within a second threshold; and selecting training data classified in the fourth group, wherein a difference between a rate of positive prediction of training data classified in the second group and a rate of positive prediction of training data classified in the fourth group is a difference lying within a third threshold.

4. The non-transitory recording medium of claim 2, wherein the augmentation item number is:

an augmentation item number of the first group in a case in which a number of training data classified in the third group is greater than the augmentation item number of the first group, and is the number of training data classified in the third group in a case in which the number of training data classified in the third group is not greater than the augmentation item number of the first group, and an augmentation item number of the second group in a case in which a number of training data classified in the fourth group is greater than the augmentation item number of the second group, and is the number of training data classified in the fourth group in a case in which the number of training data classified in the fourth group is not greater than the augmentation item number of the second group.

5. The non-transitory recording medium of claim 4, wherein in a case in which the number of training data classified in the third group is greater than the augmentation item number of the first group, training data of an amount of the augmentation item number of the first group is selected from the training data classified in the third group in sequence from a highest similarity to the training data classified in the first group; and in a case in which the number of training data classified in the fourth group is greater than the augmentation item number of the second group, training data of an amount of the augmentation item number of the second group is selected from the training data classified in the fourth group in sequence from a highest similarity to the training data classified in the second group.

6. The non-transitory recording medium of claim 1, the training data generation process further comprising:

removing from the fourth plurality of training data any training data not classifiable in the first group from among the fourth plurality of training data resulting from converting the third plurality of training data selected from the third group; and removing from the fourth plurality of training data any training data not classifiable in the second group from among the fourth plurality of training data resulting from converting the third plurality of training data selected from the fourth group.

7. A training data generation device comprising:

a memory; and a processor coupled to the memory, the processor being configured to execute processing, the processing including classifying, based on a feature value, each of a first plurality of training data, which are minority data having a first attribute, and each of a second plurality of training data, which are majority data having a second attribute that are contained in an original plurality of training data;

based on a comparison of a number of training data classified in a first group from among the first plurality of training data against a number of training data classified in a second group from among the first plurality of training data, selecting a third plurality of training data from training data classified in a third group from among the second plurality of training data and training data classified in a fourth group from among the second plurality of training data, the third group corresponding to the first group, the fourth group corresponding to the second group;

converting each of the third plurality of training data into a fourth plurality of training data having the first attribute; and generating an augmented data set by adding the fourth plurality of training data to the original plurality of training data.

8. The training data generation device of claim 7, wherein the selecting of the third plurality of training data includes:

calculating an augmentation item number for each of the first group and the second group in a case in which the number of training data is to be augmented in each of the first group and the second group, wherein a difference between a total number of training data classified in the first group and the second group and a total number of training data classified in the third group and the fourth group from the second plurality of training data is a difference lying within a first threshold while maintaining a proportion of a number of training data classified in the first group to a number of training data classified in the second group from among the first plurality of training data; and selecting for the third group and for the fourth group a respective number of training data corresponding to the augmentation item number.

9. The training data generation device of claim 8, wherein the selecting of the third plurality of training data includes:

selecting training data classified in the third group, wherein a difference between a rate of positive prediction of training data classified in the first group and a rate of positive prediction of training data classified in the third group is a difference lying within a second threshold; and selecting training data classified in the fourth group, wherein a difference between a rate of positive prediction of training data classified in the second group and a rate of positive prediction of training data classified in the fourth group is a difference lying within a third threshold.

10. The training data generation device of claim 8, wherein the augmentation item number is:

an augmentation item number of the first group in a case in which a number of training data classified in the third group is greater than the augmentation item number of the first group, and is the number of training data classified in the third group in a case in which the number of training data classified in the third group is not greater than the augmentation item number of the first group, and an augmentation item number of the second group in a case in which a number of training data classified in the fourth group is greater than the augmentation item number of the second group, and is the number of training data classified in the fourth group in a case in which the number of training data classified in the fourth group is not greater than the augmentation item number of the second group.

11. The training data generation device of claim 10, wherein in a case in which the number of training data classified in the third group is greater than the augmentation item number of the first group, training data of an amount of the augmentation item number of the first group is selected from the training data classified in the third group in sequence from a highest similarity to the training data classified in the first group; and in a case in which the number of training data classified in the fourth group is greater than the augmentation item number of the second group, training data of an amount of the augmentation item number of the second group is selected from the training data classified in the fourth group in sequence from a highest similarity to the training data classified in the second group.

12. The training data generation device of claim 7, the processing further comprising:

removing from the fourth plurality of training data any training data not classifiable in the first group from among the fourth plurality of training data resulting from converting the third plurality of training data selected from the third group; and removing from the fourth plurality of training data any training data not classifiable in the second group from among the fourth plurality of training data resulting from converting the third plurality of training data selected from the fourth group.

13. A training data generation method comprising:

classifying, based on a feature value, each of a first plurality of training data, which are minority data having a first attribute, and each of a second plurality of training data, which are majority data having a second attribute that are contained in an original plurality of training data;

by a processor, based on a comparison of a number of training data classified in a first group from among the first plurality of training data against a number of training data classified in a second group from among the first plurality of training data, selecting a third plurality of training data from training data classified in a third group from among the second plurality of training data and training data classified in a fourth group from among the second plurality of training data, the third group corresponding to the first group, the fourth group corresponding to the second group;

converting each of the third plurality of training data into a fourth plurality of training data having the first attribute; and generating an augmented data set by adding the fourth plurality of training data to the original plurality of training data.

14. The training data generation method of claim 13, wherein the selecting of the third plurality of training data includes:

calculating an augmentation item number for each of the first group and the second group in a case in which the number of training data is to be augmented in each of the first group and the second group, wherein a difference between a total number of training data classified in the first group and the second group and a total number of training data classified in the third group and the fourth group from the second plurality of training data is a difference lying within a first threshold while maintaining a proportion of a number of training data classified in the first group to a number of training data classified in the second group from among the first plurality of training data; and selecting for the third group and for the fourth group a respective number of training data corresponding to the augmentation item number.

15. The training data generation method of claim 14, wherein the selecting of the third plurality of training data includes:

selecting training data classified in the third group, wherein a difference between a rate of positive prediction of training data classified in the first group and a rate of positive prediction of training data classified in the third group is a difference lying within a second threshold; and selecting training data classified in the fourth group, wherein a difference between a rate of positive prediction of training data classified in the second group and a rate of positive prediction of training data classified in the fourth group is a difference lying within a third threshold.

16. The training data generation method of claim 14, wherein the augmentation item number is:

an augmentation item number of the first group in a case in which a number of training data classified in the third group is greater than the augmentation item number of the first group, and is the number of training data classified in the third group in a case in which the number of training data classified in the third group is not greater than the augmentation item number of the first group, and an augmentation item number of the second group in a case in which a number of training data classified in the fourth group is greater than the augmentation item number of the second group, and is the number of training data classified in the fourth group in a case in which the number of training data classified in the fourth group is not greater than the augmentation item number of the second group.

17. The training data generation method of claim 16, wherein in a case in which the number of training data classified in the third group is greater than the augmentation item number of the first group, training data of an amount of the augmentation item number of the first group is selected from the training data classified in the third group in sequence from a highest similarity to the training data classified in the first group; and in a case in which the number of training data classified in the fourth group is greater than the augmentation item number of the second group, training data of an amount of the augmentation item number of the second group is selected from the training data classified in the fourth group in sequence from a highest similarity to the training data classified in the second group.

18. The training data generation method of claim 13, further comprising:

removing from the fourth plurality of training data any training data not classifiable in the first group from among the fourth plurality of training data resulting from converting the third plurality of training data selected from the third group; and removing from the fourth plurality of training data any training data not classifiable in the second group from among the fourth plurality of training data resulting from converting the third plurality of training data selected from the fourth group.

* * * * *